US012804506B2

(12) United States Patent
Xiong et al.

(10) Patent No.: US 12,804,506 B2
(45) Date of Patent: Nov. 17, 2026

(54) METHOD AND DEVICE FOR MANAGEMENT OF MOBILITY OF TERMINAL DEVICE

(71) Applicant: Beijing Xiaomi Mobile Software Co., Ltd., Beijing (CN)

(72) Inventors: Yi Xiong, Beijing (CN); Yumin Wu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 255 days.

(21) Appl. No.: 18/858,920

(22) PCT Filed: Apr. 22, 2022

(86) PCT No.: PCT/CN2022/088631
§ 371 (c)(1),
(2) Date: Oct. 22, 2024

(87) PCT Pub. No.: WO2023/201754
PCT Pub. Date: Oct. 26, 2023

(65) Prior Publication Data
US 2025/0280346 A1 Sep. 4, 2025

(51) Int. Cl.
*H04W 36/36* (2009.01)
*H04W 36/24* (2009.01)

(52) U.S. Cl.
CPC ....... *H04W 36/362* (2023.05); *H04W 36/249* (2023.05)

(58) Field of Classification Search
CPC ............ H04L 5/0035; H04W 36/0069; H04W 36/00692–00698; H04W 36/249; H04W 36/362
See application file for complete search history.

(56) References Cited

U.S. PATENT DOCUMENTS

2022/0264680 A1* 8/2022 Kim .................. H04W 74/0833
2023/0007550 A1* 1/2023 Kumar ............ H04W 36/00692
(Continued)

FOREIGN PATENT DOCUMENTS

CN 113141638 A 7/2021
WO WO 2021067236 A1 4/2021
(Continued)

OTHER PUBLICATIONS

Futurewei, "Remaining issues on procedure and signaling for CPAC" 3rd Generation Partnership Project, 3GPP TSG-RAN WG2 Meeting #108, R2-1914985, Reno, USA Nov. 18-22, 2019, accessed via https://www.3gpp.org/ftp/tsg_ran/wg2_rl2/TSGR2_108/Docs on Aug. 19, 2026, uploaded Nov. 8, 2019, pp. 1-6 (Year: 2019).*
(Continued)

*Primary Examiner* — Thomas R Cairns
(74) *Attorney, Agent, or Firm* — Finnegan, Henderson, Farabow, Garrett & Dunner, L.L.P.

(57) ABSTRACT

A method for management of mobility of a terminal is performed by a terminal, and includes: receiving information configured for conditional mobility that is sent by a network device, wherein the information configured for conditional mobility includes one of: a configuration of a conditional handover and a configuration of a conditional primary secondary cell (PSCell) change, or a configuration of the conditional handover and a configuration of a conditional PSCell addition; and executing the conditional mobility according to a satisfaction of an execution condition of the conditional mobility.

20 Claims, 6 Drawing Sheets

(56) References Cited

U.S. PATENT DOCUMENTS

| | | | | |
|---|---|---|---|---|
| 2024/0430967 | A1* | 12/2024 | Choi | H04W 76/19 |
| 2025/0142439 | A1* | 5/2025 | Min | H04W 76/15 |
| 2025/0159569 | A1* | 5/2025 | Ramachandra | H04W 36/362 |

FOREIGN PATENT DOCUMENTS

| | | | |
|---|---|---|---|
| WO | WO 2021109389 | A1 | 6/2021 |
| WO | WO 2021109394 | A1 | 6/2021 |
| WO | 2022028920 | A1 | 2/2022 |
| WO | 2022058069 | A1 | 3/2022 |
| WO | 2022074564 | A1 | 4/2022 |

OTHER PUBLICATIONS

Futurewei, "Handling of multiple candidate cells for CPAC," 3rd Generation Partnership Project, 3GPP TSG-RAN WG2 Meeting #108, R2-1914986, Reno, USA Nov. 18-22, 2019, accessed via https://www.3gpp.org/ftp/tsg_ran/wg2_rl2/TSGR2_108/Docs on Aug. 19, 2026, uploaded Nov. 8, 2019, pp. 1-6 (Year: 2019).*

Potevio, "Considerations on failure handling for CPAC for NR," 3rd Generation Partnership Project, 3GPP TSG-RAN WG2 Meeting #108, R2-1915915, Reno, USA Nov. 18-22, 2019, accessed via https://www.3gpp.org/ftp/tsg_ran/wg2_rl2/TSGR2_108/Docs on Aug. 19, 2026, uploaded Nov. 8, 2019, pp. 1-5 (Year: 2019).*

China Telecom, "Further details of CHO configuration and execution," 3rd Generation Partnership Project, 3GPP TSG-RAN WG2 Meeting #108, R2-1915963, Reno, USA Nov. 18-22, 2019, accessed via https://www.3gpp.org/ftp/tsg_ran/wg2_rl2/TSGR2_108/Docs on Aug. 19, 2026, uploaded Nov. 8, 2019, pp. 1-5 (Year: 2019).*

Nec, "Further discussion on Co-existence of CHO and CPAC," 3rd Generation Partnership Project, 3GPP TSG-RAN WG2 Meeting #116bis-e, R2-2200614, Electronic Meeting, Jan. 17-25, 2022, accessed via https://www.3gpp.org/ftp/tsg_ran/wg2_nl2/ TSGR2116bis-e/Docs on Aug. 19, 2026, uploaded Jan. 11, 2022, pp. 1-5 (Year: 2022).*

Lenovo et al., "Coexistence of CHO and CPAC," 3rd Generation Partnership Project, 3GPP TSG-RAN WG2 Meeting #117-e, R2-2202579, Electronic Meeting, Jan. 17-25, 2022, accessed via https://www.3gpp.org/ftp/tsg_ran/wg2_rl2/TSGR2_117-e/Docs on Aug. 19, 2026, uploaded Feb. 14, 2022, pp. 1-19 (Year: 2022).*

"Coexistence of CHO and CPAC", Samsung, 3GPP TSG RAN WG1 #105-e, R2-2202759, e-Meeting, May 10-27, 2021, 11 pages.

"Discussion on coexistence of CHO and CPAC", InterDigital, Nokia, Nokia Shanghai Bell, 3GPP RAN WG2 Meeting #117, R2-2202759, Electronic, Feb. 21-Mar. 3, 2022, 13 pages.

Extended European Search Report Issued in Application No. 22937990.4 dated May 16, 2025, 12 pages.

Notice of Reasons for Refusal issued by the Japanese Patent Office on Aug. 22, 2025, in corresponding Application No. JP 2024-561961, 13 pages.

Search Report and Written Opinion of the International Searching Authority issued in Application No. PCT/CN2022/088631, Nov. 28, 2022, 21 pages.

CATT (Rapporteur), "Report on Email Discussion [107b#52][NR MobE] Open Issues Conditional PSCell Addition/Change (CATT)", 3GPP TSG-RAN WG2 Meeting #108, R2-1915962, Reno, USA, Nov. 18-22, 2019, 46 pages.

* cited by examiner

METHOD AND DEVICE FOR MANAGEMENT OF MOBILITY OF TERMINAL DEVICE

CROSS-REFERENCE TO RELATED APPLICATIONS

This application is the US national phase application of International Application No. PCT/CN2022/088631, filed on Apr. 22, 2022, the entire contents of which are incorporated herein by reference.

TECHNICAL FIELD

The present disclosure relates to a field of communications technologies, and particularly to a method and a device for management of mobility of a terminal.

BACKGROUND

A dual connectivity (DC) terminal may access two cell groups, which are respectively a master cell group (MCG) and a secondary cell group (SCG). The MCG corresponds to a network master node (MN), and the SCG corresponds to a network secondary node (SN).

In a current system, the terminal may implement a conditional mobility based on a condition configured by a network device and an associated candidate cell. The condition configured by the network device may be a specific event based on a measurement result, a location-based event, a time-based event, or the like. The terminal may perform MCG mobility by performing conditional handover, and perform SCG mobility by performing a conditional primary second cell (PSCell) addition or a conditional PSCell change.

However, this conditional mobility is only applicable to scenarios where conditional handover or conditional PSCell addition/conditional PSCell change is configured separately, and conditional handover and conditional PSCell addition/conditional PSCell change are not supported at the same time.

SUMMARY

In a first aspect, embodiments of the present disclosure provide a method for management of mobility of a terminal. The method is performed by a terminal, and the method includes:

receiving information configured for conditional mobility that is sent by a network device, in which the information configured for conditional mobility includes one of: a configuration of a conditional handover and a configuration of a conditional PSCell change, or a configuration of the conditional handover and a configuration of a conditional PSCell addition; and executing the conditional mobility according to a satisfaction of an execution condition of the conditional mobility.

In a second aspect, embodiments of the present disclosure provide a method for management of mobility of a terminal. The method is performed by a network device, and the method includes:

sending information configured for conditional mobility to a terminal, in which the information configured for the conditional mobility includes one of: a configuration of a conditional handover and a configuration of a conditional PSCell change, a configuration of the conditional handover and a configuration of a conditional PSCell addition.

In a third aspect, embodiments of the present disclosure provide a terminal. The terminal includes a processor, and a memory storing a computer program executable by the processor. The processor is configured to:

receive information configured for conditional mobility that is sent by a network device, in which the information configured for conditional mobility includes one of: a configuration of a conditional handover and a configuration of a conditional PSCell change, or a configuration of the conditional handover and a configuration of a conditional PSCell addition; and executing the conditional mobility according to a satisfaction of an execution condition of the conditional mobility In a fourth aspect, embodiments of the present disclosure provide a network device. The network device includes a processor and a memory storing a computer program executable by the processor. The processor is configured to perform the method according to the second aspect.

According to a fifth aspect, embodiments of the present disclosure provide a non-transitory computer-readable storage medium for storing instructions that, when being executed by a processor of a terminal, cause the terminal to implement the method according to the first aspect.

According to a sixth aspect, embodiments of the present disclosure provide a non-transitory computer-readable storage medium for storing instructions that, when being executed by a processor of a network device, cause the network device to implement the method according to the second aspect.

BRIEF DESCRIPTION OF THE DRAWINGS

The accompanying drawings of the present disclosure are briefly described below.

DETAILED DESCRIPTION

For ease of understanding, terms involved in the present disclosure are first introduced.

1. A Primary Cell (PCell)

In a master cell group (MCG), there may be a plurality of cells, one of which is used to initiate an initial access cell, and this cell is referred to as a PCell. As the name implies, the PCell is the most "primary" cell in the MCG.

2. A Secondary Cell (SCell)

A secondary cell in the MCG is an SCell, a PCell in the MCG and an SCell in the MCG are jointly combined through a carrier aggregation (CA), and the MCG includes one or more SCells.

3. A Primary Secondary Cell (PSCell)

A PSCell in a secondary cell group (SCG) is a PSCell, and the SCG includes one or more SCells.

4. A Conditional Handover

The terminal may, based on a preconfigured condition, select a target network device, initiate a handover execution process, and initiate random access to the target network device. The terminal may implement mobility of the MCG by executing the conditional handover.

5. A Conditional PSCell Addition

The terminal may determine a PSCell that can be added according to a preconfigured condition. The terminal may implement mobility of the SCG by executing the conditional PSCell addition.

6. A Conditional PSCell Change

The terminal may determine an accessible target PSCell according to a preconfigured condition. The terminal may implement mobility of the SCG by executing the conditional PSCell change.

7. A Mobility Procedure Triggered Based on a Condition

In a 5th generation mobile communication technology (5G) system, the terminal may perform cell movement based on a "pre-configured condition" of the network device and a "pre-configured cell" corresponding to this condition. When the terminal satisfies the "pre-configured condition", for example, a specific measurement event, the terminal changes the serving cell to the "pre-configured cell". The conditional mobility procedure includes a conditional handover, a conditional PSCell addition, and a conditional PSCell change.

In order to better understand the method for management of mobility of a terminal disclosed in the embodiments of the present disclosure, a communication system applicable to the embodiments of the present disclosure is described first.

Figure 1:
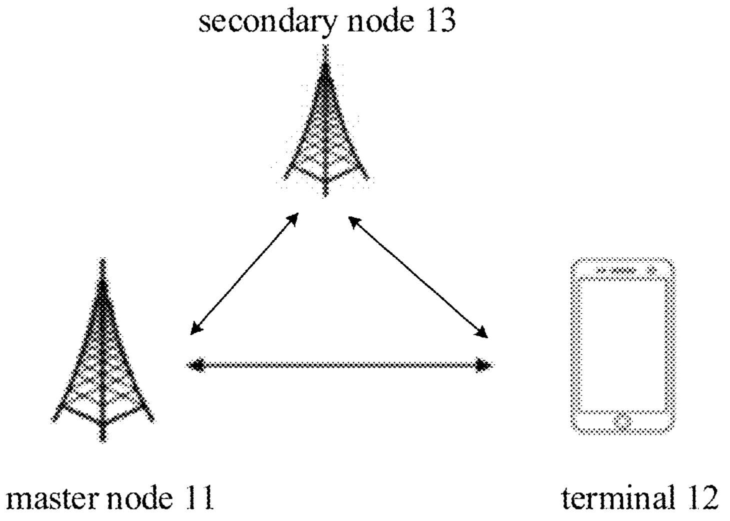
FIG. 1 is a schematic architectural diagram of a communication system according to an embodiment of the present disclosure.

FIG. 1 is a schematic architectural diagram of a communication system according to an embodiment of the present disclosure. The communication system may include, but is not limited to, a network device and a terminal, the number and form of devices shown in FIG. 1 are only used for example and do not constitute a limitation on the embodiments of the present disclosure, and the actual application may include two or more network devices, two or more auxiliary communication devices, two or more terminals. The communications system shown in FIG. 1 includes a master node 11, a terminal 12, and a secondary node 13.

It should be noted that technical solutions of the embodiments of the present disclosure are applicable to various communication systems. For example, a long term evolution (LTE) system, a 5th generation (5G) mobile communication system, a 5G new radio (NR) system, or any other future new mobile communication system.

The master node 11 and the secondary node 13 in the embodiments of the present disclosure are entities for transmitting or receiving signals on a network side, and may be a master node and a secondary node corresponding to the terminal 12, respectively. For example, the master node 11 and the secondary node 13 may be an evolved base station (eNB), a transmission reception point (TRP), a next generation NodeB (gNB) in the NR system, an access node in another future mobile communication system, or an access node in a wireless fidelity (WiFi) system. A specific technology and a specific device form used by the network device are not limited in the embodiments of the present disclosure. The network device provided in the embodiments of the present disclosure may be composed of a central unit (CU) and a distributed unit (DU). The CU may also be referred to as a control unit. The network device, for example, a protocol layer of the base station, may be split by using a CU-DU structure, functions of some protocol layers are controlled in the CU set, and functions of some or all of the remaining protocol layers are distributed in the DU, and the DU is controlled by the CU set.

The terminal 12 in the embodiments of the present disclosure is an entity for receiving or transmitting a signal, such as a mobile phone, on the user side. The terminal may also be referred to as a terminal, a user equipment (UE), a mobile station (MS), a mobile terminal (MT), or the like. The terminal may be a vehicle with a communication function, a smart car, a mobile phone, a wearable device, a tablet computer (Pad), a computer with a wireless transceiver function, a virtual reality (VR) terminal, an augmented reality (AR) terminal, a wireless terminal in industrial control, a wireless terminal in self-driving, a wireless terminal in a remote medical surgery, a wireless terminal in a smart grid, a wireless terminal in transportation safety, a wireless terminal in a smart city, a wireless terminal in a smart home, and the like. A specific technology and a specific device form used by the terminal are not limited in the embodiments of the present disclosure.

It can be understood that the communication system described in the embodiments of the present disclosure is intended to describe the technical solutions of the embodiments of the present disclosure more clearly and does not constitute a limitation on the technical solutions provided in the embodiments of the present disclosure, and a person of ordinary skill in the art can know that as the evolution of the system architecture and the appearance of the new service scenario, the technical solutions provided in the embodiments of the present disclosure are also applicable to similar technical problems.

In order to support simultaneous configuration of the conditional handover and the conditional PSCell addition/conditional PSCell change, a triggering method for the simultaneous configuration of the conditional handover and the conditional PSCell addition/conditional PSCell change needs to be studied. In the present disclosure, the network device may send information configured for conditional mobility to the terminal, and then the terminal may selectively perform the conditional mobility according to a satisfaction of an execution condition of the conditional mobility, to improve reliability and accuracy of the mobility management.

It should be noted that, in the present disclosure, the method for management of mobility of a terminal provided in any embodiment may be performed separately, or may be performed together with the possible implementations in other embodiments, or may be performed together with any technical solution in the related art.

The method and apparatus for management of mobility of a terminal provided by the present disclosure will be described in detail below with reference to the accompanying drawings.

Figure 2:
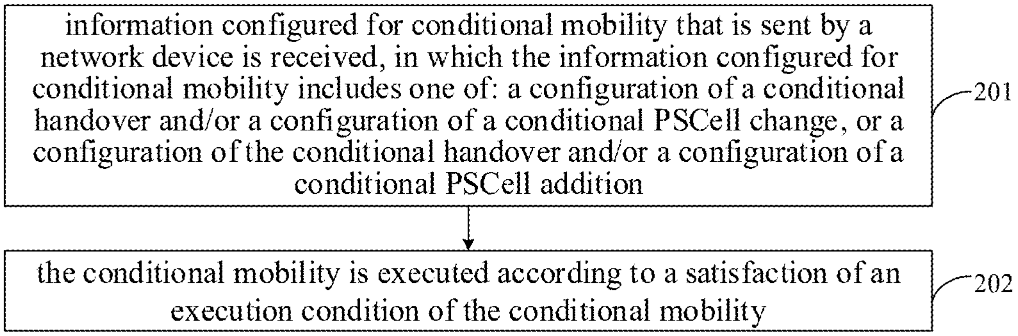
FIG. 2 is a schematic flowchart of a method for management of mobility of a terminal according to an embodiment of the present disclosure.

FIG. 2 is a schematic flowchart of a method for management of mobility of a terminal according to an embodiment of the present disclosure. As shown in FIG. 2, the method may include, but is not limited to, the following steps.

Step 201: information configured for conditional mobility that is sent by a network device is received, in which the information configured for conditional mobility includes one of: a configuration of a conditional handover and/or a configuration of a conditional PSCell change, or a configuration of the conditional handover and/or a configuration of a conditional PSCell addition.

The information configured for conditional mobility may include conditional reconfiguration information.

In an embodiment, the information configured for conditional mobility may include at least one of: an execution condition of the conditional mobility, configuration information of a target cell, an association relationship between the conditional handover and the conditional PSCell addition, and an association relationship between the conditional handover and the conditional PSCell change.

In an embodiment, the configuration of the conditional handover may be associated with the configuration of the conditional PSCell change, or the configuration of the conditional handover may be associated with the configuration of the conditional PSCell addition. That is, the terminal may receive the conditional handover and the conditional PSCell change jointly configured by the network device, or the terminal may also receive the conditional handover and the conditional PSCell addition jointly configured by the network device. The combined configuration may be that the configuration of the conditional handover is associated with the configuration of the conditional PSCell change, or the configuration of the conditional handover is associated with the configuration of the conditional PSCell addition, which is implicitly or explicitly indicated by the network device through the sent information.

For example, the configuration of the conditional handover and conditional PSCell change (or conditional PSCell addition) may be included in a same configuration message, indicating that the configuration of the conditional handover is associated with the configuration of the conditional PSCell change (or conditional PSCell addition).

Alternatively, the configuration of the conditional handover and the configuration of the conditional PSCell change may be respectively associated with a same configuration identifier, indicating that the configuration of the conditional handover is associated with the configuration of the conditional PSCell change. And correspondingly, the configuration of the conditional handover and the configuration of the conditional PSCell addition are respectively associated with a same configuration identifier, indicating that the configuration of the conditional handover is associated with the configuration of the conditional PSCell addition. The configuration identifier may be any information that can be used for uniquely determining the combined configuration, such as a conditional reconfiguration number, which is not limited in the present disclosure.

Alternatively, an association of the configuration of the conditional handover and the configuration of the conditional PSCell change (or conditional PSCell addition) may be indicated by indicating a configuration of an associated conditional PSCell change or a configuration of an associated conditional PSCell addition in in the configuration of the conditional handover.

Alternatively, an association of the configuration of the conditional handover and the configuration of the conditional PSCell change or an association of the configuration of the conditional handover and the configuration of the conditional PSCell addition may be indicated by indicating the configuration of the associated conditional handover in the configuration of the conditional PSCell change or the configuration of the conditional PSCell addition.

Alternatively, an association of the configuration of the conditional handover and the configuration of the conditional PSCell change or an association of the configuration of the conditional handover and the configuration of the conditional PSCell addition may be indicated through association information.

For example, the association of the configuration of the conditional handover and the configuration of the conditional PSCell change or the association of the configuration of the conditional handover and the configuration of the conditional PSCell addition may be indicated through information elements (IE); or the association of the configuration of the conditional handover and the configuration of the conditional PSCell change or the association of the configuration of the conditional handover and the configuration of the conditional PSCell addition may be indicated through an association field.

Step 202: the conditional mobility is executed according to a satisfaction of an execution condition of the conditional mobility.

In the present disclosure, the terminal may evaluate the execution condition of the conditional mobility, and when it is determined that the terminal satisfies any execution condition of the conditional mobility, the conditional mobility may be performed.

In an embodiment, when determining that the execution condition of the conditional handover is satisfied, the terminal may perform MCG mobility, or when determining that the execution condition of the conditional PSCell addition is satisfied, the terminal may perform SCG mobility, and the like, which is not limited in the present disclosure.

In the present disclosure, after receiving the information configured for conditional mobility sent by the network device, the terminal may perform the conditional mobility according to a satisfaction of an execution condition of the conditional mobility. Therefore, according to the satisfaction of the execution condition of the conditional mobility, the corresponding conditional mobility is selectively executed, thereby improving the reliability, accuracy and robustness of the mobility management.

Figure 3:
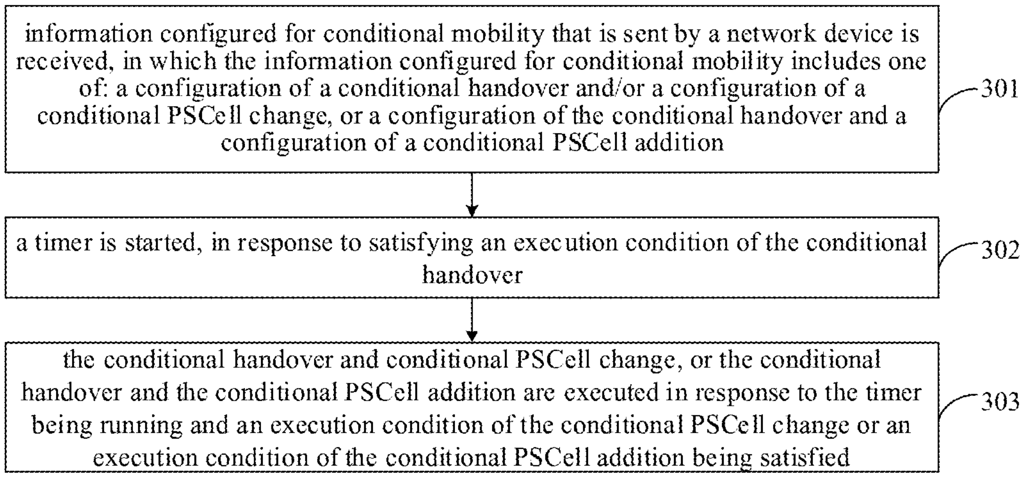
FIG. 3 is a schematic flowchart of a method for management of mobility of a terminal according to an embodiment of the present disclosure.

FIG. 3 is a schematic flowchart of a method for management of mobility of a terminal according to an embodiment of the present disclosure. As shown in FIG. 3, the method may include but is not limited to the following steps.

Step 301: information configured for conditional mobility that is sent by a network device is received, in which the information configured for conditional mobility includes one of: a configuration of a conditional handover and/or a configuration of a conditional PSCell change, or a configuration of the conditional handover and/or a configuration of a conditional PSCell addition.

In the present disclosure, for a specific implementation process of step 301, reference may be made to the detailed description of any embodiment of the present disclosure, and details are not described herein again.

Step 302: a timer is started, in response to satisfying an execution condition of the conditional handover.

Step 303: the conditional handover and conditional PSCell change, or the conditional handover and the conditional PSCell addition are executed in response to the timer being running and an execution condition of the conditional PSCell change or an execution condition of the conditional PSCell addition being satisfied.

In an embodiment, when the timer is running and the terminal satisfies the execution condition of the conditional PSCell change or conditional PSCell addition, no matter whether the execution condition of the conditional handover is satisfied at this time, the terminal may execute the conditional handover and the conditional PSCell change (or the conditional PSCell addition). That is, the configurations of the corresponding conditional handover and conditional PSCell change (or conditional PSCell addition) are applied, for example, radio resource control (RRC) reconfiguration.

In an embodiment, when the timer is running and the terminal satisfies the execution condition of the conditional PSCell change, if the execution condition of the conditional handover is still satisfied, i.e., the terminal simultaneously satisfies the execution conditions of the conditional handover and the conditional PSCell change, the conditional handover and the conditional PSCell change may be executed.

In an embodiment, when the timer is running and the terminal satisfies the execution condition of the conditional PSCell addition, if the execution condition of the conditional handover is still satisfied, i.e., the terminal simultaneously satisfies the execution conditions of the conditional handover and the conditional PSCell addition, the conditional handover and the conditional PSCell addition may be executed.

In an embodiment, when the timer is running, the timer may be stopped in a case that the terminal satisfies the execution condition of the conditional PSCell change or the execution condition of the conditional PSCell addition.

In the present disclosure, after receiving the information configured for the conditional mobility that is sent by the network device, the terminal starts the timer in response to satisfying the execution condition of the conditional handover, and executes the conditional handover and the conditional PSCell change or execute the conditional handover and the conditional PSCell addition, in response to the timer being running and the execution condition of the conditional PSCell change or the execution condition of the conditional PSCell addition being satisfied. Therefore, according to the satisfaction of the execution condition of the conditional mobility, the corresponding conditional mobility is selectively executed, thereby improving the reliability, accuracy and robustness of the mobility management.

Figure 4:
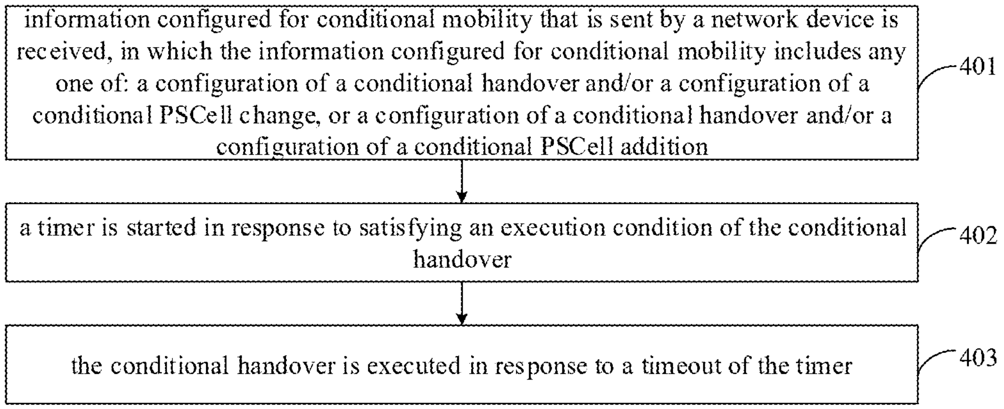
FIG. 4 is a schematic flowchart of a method for management of mobility of a terminal according to an embodiment of the present disclosure.

FIG. 4 is a schematic flowchart of a method for management of mobility of a terminal according to an embodiment of the present disclosure. As shown in FIG. 4, the method may include but is not limited to the following steps.

Step 401: information configured for conditional mobility that is sent by a network device is received, in which the information configured for conditional mobility includes any one of: a configuration of a conditional handover and/or a configuration of a conditional PSCell change, or a configuration of a conditional handover and/or a configuration of a conditional PSCell addition.

Step 402: a timer is started in response to satisfying an execution condition of the conditional handover.

In the present disclosure, for a specific implementation process of step 401 to step 402, reference may be made to the detailed description of any embodiment of the present disclosure, and details are not described herein again.

Step 403: the conditional handover is executed in response to a timeout of the timer.

In the present disclosure, in a case of the timeout of the timer, the terminal may apply the configuration corresponding to the conditional handover to execute the conditional handover, for example, an RRC reconfiguration associated with the conditional handover is applied.

In an embodiment, in a case of the timeout of the timer and the terminal still not satisfying the execution condition of the conditional PSCell change or the conditional PSCell addition, the terminal may apply the configuration corresponding to the conditional handover to execute the conditional handover, for example, an RRC reconfiguration associated with the conditional handover is applied.

In an embodiment, in a case of the timeout of the timer, the terminal may delete the information configured for the conditional mobility.

In an embodiment, deleting, by the terminal, the information configured for the conditional mobility includes deleting one or more of an execution condition of the conditional mobility, configuration information of a target cell, an association relationship between the conditional handover and the conditional PSCell addition, and an association relationship between the conditional handover and the conditional PSCell change.

In an embodiment, in a case of the timeout of the timer, the terminal may delete the configuration of the conditional handover and/or the configuration of the conditional PSCell change (or the conditional PSCell addition) associated with the conditional handover.

In an embodiment, in a case of the timeout of the timer, the terminal may delete all or part of the configuration of the conditional handover. In an embodiment, in a case of the timeout of the timer, the terminal may delete all or part of the configuration of the conditional PSCell change (or the conditional PSCell addition). In an embodiment, in a case of the timeout of the timer and the terminal satisfying the execution condition of the conditional handover, the conditional handover may be executed.

In an embodiment, in a case of the timeout of the timer and the terminal satisfying the execution condition of the conditional handover, the conditional handover may be performed even though the execution condition of the conditional PSCell change is not satisfied.

In the present disclosure, after receiving the information configured for conditional mobility sent by the network device, the terminal starts the timer in response to the execution condition of the conditional handover being satisfied, and executes the conditional handover in response to the timeout of the conditional handover. Therefore, according to the satisfaction of the execution condition of the conditional mobility, the corresponding conditional mobility is selectively executed, thereby improving the reliability, accuracy and robustness of mobility management.

Figure 5:
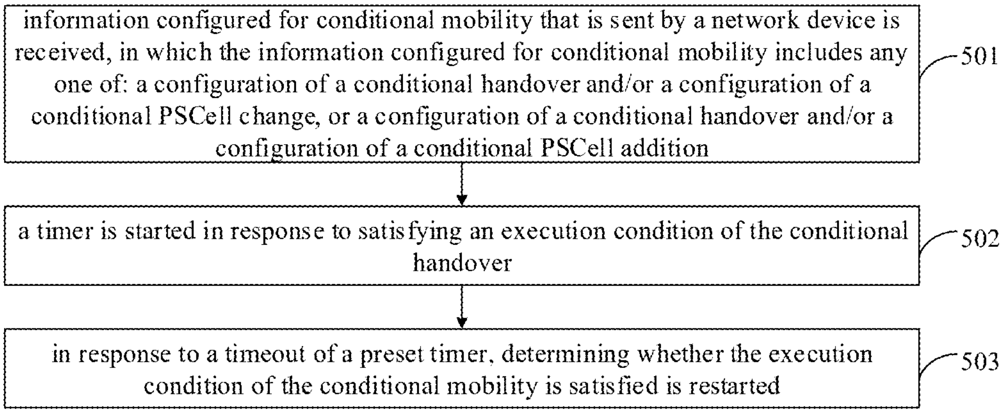
FIG. 5 is a schematic flowchart of a method for management of mobility of a terminal according to an embodiment of the present disclosure.

FIG. 5 is a schematic flowchart of a method for management of mobility of a terminal according to an embodiment of the present disclosure. As shown in FIG. 5, the method may include but is not limited to the following steps.

Step 501: information configured for conditional mobility that is sent by a network device is received, in which the information configured for conditional mobility includes any one of: a configuration of a conditional handover and/or a configuration of a conditional PSCell change, or a configuration of a conditional handover and/or a configuration of a conditional PSCell addition.

Step 502: a timer is started in response to satisfying an execution condition of the conditional handover.

In the present disclosure, for a specific implementation process of step 501 to step 502, reference may be made to the detailed description of any embodiment of the present disclosure, and details are not described herein again.

Step 503: in response to a timeout of a preset timer, determining whether the execution condition of the conditional mobility is satisfied is restarted.

In an embodiment, it is determined whether an execution condition of the conditional handover and the conditional PSCell change is satisfied, in response to a timeout of a preset timer.

In an embodiment, it is determined whether an execution condition of the conditional handover and the conditional PSCell addition is satisfied, in response to a timeout of a preset timer.

In an embodiment, it is determined whether the execution condition of the conditional handover and the execution condition of the conditional PSCell change are satisfied, in response to a timeout of a preset timer.

In an embodiment, it is determined whether the execution condition of the conditional handover and the execution condition of the execution condition of the conditional PSCell addition are satisfied, in response to a timeout of a preset timer.

In the present disclosure, in a case of the timeout of the timer, the terminal may re-determine the satisfaction of the execution condition of the conditional mobility.

In an embodiment, in a case of the timeout of the timer, the terminal may re-determine the satisfaction of the execution condition of the conditional handover and the conditional PSCell change.

In an embodiment, in a case of the timeout of the timer, the terminal may re-determine the satisfaction of the execution condition of the conditional handover and the conditional PSCell addition.

In an embodiment, in a case of the timeout of the timer, the terminal may re-determine the satisfaction of the execution condition of the conditional handover and the execution condition of the conditional PSCell change.

In an embodiment, in a case of the timeout of the timer, the terminal may re-determine the satisfaction of the execution condition of the conditional handover and the execution condition of the conditional PSCell addition.

In the present disclosure, after receiving the information configured for conditional mobility sent by the network device, the terminal starts the timer in response to the execution condition of the conditional handover is satisfied, and restarts to determine whether the execution conditions of the conditional handover and the conditional PSCell change is satisfied in response to the timeout of the timer. Therefore, according to the satisfaction of the execution condition of the conditional mobility, the corresponding conditional mobility is selectively executed, thereby improving the reliability, accuracy and robustness of mobility management.

Figure 6A:
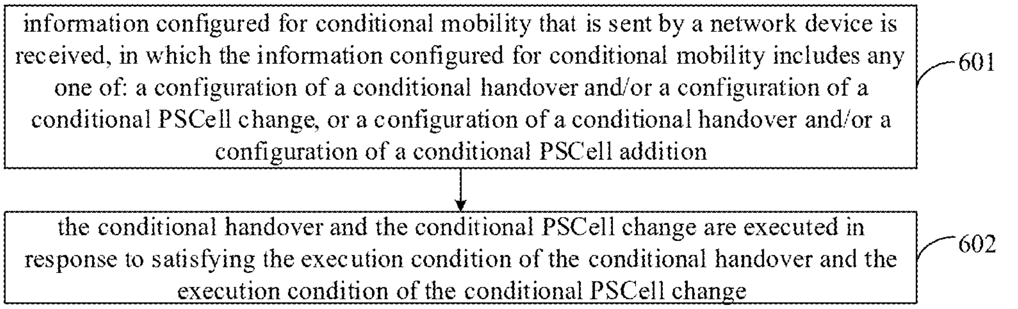
FIG. 6*a* is a schematic flowchart of a method for management of mobility of a terminal according to an embodiment of the present disclosure.

Referring to FIG. 6*a*, FIG. 6*a* is a schematic flowchart of a method for management of mobility of a terminal according to an embodiment of the present disclosure. As shown in FIG. 6*a*, the method may include but is not limited to the following steps.

Step 601: information configured for conditional mobility that is sent by a network device is received, in which the information configured for conditional mobility includes any one of: a configuration of a conditional handover and/or a configuration of a conditional PSCell change, or a configuration of a conditional handover and/or a configuration of a conditional PSCell addition.

In the present disclosure, for a specific implementation process of step 601, reference may be made to the detailed description of any embodiment of the present disclosure, and details are not described herein again.

Step 602: the conditional handover and the conditional PSCell change are executed in response to satisfying the execution condition of the conditional handover and the execution condition of the conditional PSCell change.

In the present disclosure, the terminal may evaluate the execution condition of the conditional handover and the execution condition of the conditional PSCell change respectively to determine whether the terminal satisfies the execution condition of the conditional handover and the execution condition of the conditional PSCell change, and when the execution condition of the conditional handover and the execution condition of the conditional PSCell change are satisfied, the conditional handover and the conditional PSCell change may be executed.

In an embodiment, the terminal may execute the conditional handover and the conditional PSCell addition in response to determining that the execution condition of the conditional handover and the execution condition of the conditional PSCell addition are satisfied.

That is, the terminal may separately evaluate the execution condition of the conditional handover and the execution condition of the conditional PSCell addition to determine whether the terminal satisfies the execution condition of the conditional handover and the execution condition of the conditional PSCell addition, and when the execution condition of the conditional handover and the execution condition of the conditional PSCell addition are satisfied, the conditional handover and the conditional PSCell addition may be executed.

For example, the execution condition of the conditional handover is that a first measurement value is greater than a first threshold, the execution condition of the conditional PSCell change is that a second measurement value is greater than a second threshold, the terminal may evaluate whether the first measurement value is greater than the first threshold and whether the second measurement value is greater than the second threshold, and if it is determined that the first measurement value is greater than the first threshold and the second measurement value is greater than the second threshold, the conditional handover and the conditional PSCell change may be performed.

In an embodiment, the first measurement value and the second measurement value may be measurement values of a same measurement quantity, or may be measurement values of different measurement quantities, which is not limited in the present disclosure.

In the present disclosure, after receiving the information configured for conditional mobility sent by the network device, the terminal may perform the conditional handover and the conditional PSCell change (or the conditional PSCell addition) in response to the execution condition of the conditional handover and the execution condition of the conditional PSCell change (or the conditional PSCell addition) being satisfied. Therefore, according to the satisfaction of the execution condition of the conditional mobility, the corresponding conditional mobility is selectively executed, thereby improving the reliability, accuracy and robustness of mobility management.

Figure 6B:
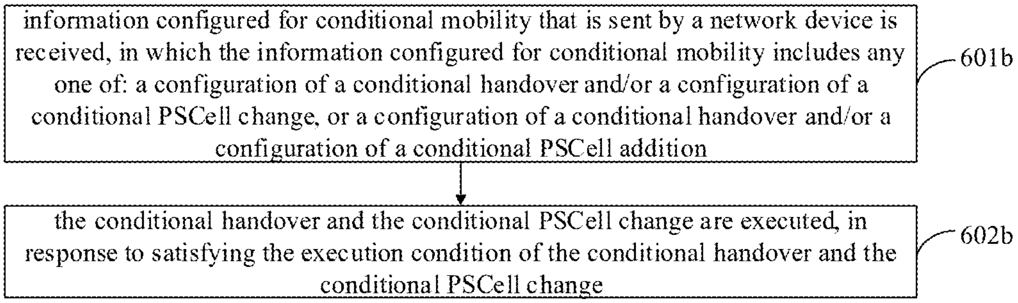
FIG. 6*b* is a schematic flowchart of a method for management of mobility of a terminal according to an embodiment of the present disclosure.

Referring to FIG. 6*b*, FIG. 6*b* is a schematic flowchart of a method for management of mobility of a terminal according to an embodiment of the present disclosure. As shown in FIG. 6*b*, the method may include but is not limited to the following steps.

Step 601*b*: information configured for conditional mobility that is sent by a network device is received, in which the information configured for conditional mobility includes any one of: a configuration of a conditional handover and/or a configuration of a conditional PSCell change, or a configuration of a conditional handover and/or a configuration of a conditional PSCell addition.

In the present disclosure, for a specific implementation process of step 601*b*, reference may be made to the detailed description of any embodiment of the present disclosure, and details are not described herein again.

Step 602*b*: the conditional handover and the conditional PSCell change are executed, in response to satisfying the execution condition of the conditional handover and the conditional PSCell change.

In the present disclosure, the terminal may evaluate the execution condition of the conditional handover and the conditional PSCell change to determine whether the terminal satisfies the execution conditions of the conditional handover and the conditional PSCell change, and when the execution conditions of the conditional handover and the conditional PSCell change are satisfied, the conditional handover and the conditional PSCell change may be executed. The execution condition of the conditional handover and the execution condition of the conditional PSCell change are the same.

In an embodiment, the execution conditions of the conditional handover and the conditional PSCell change are a same execution condition. For example, the execution conditions of the conditional handover and the conditional PSCell change are that a measurement value is greater than a third threshold. Therefore, the terminal may execute the conditional handover and the conditional PSCell change when determining that the measurement value is greater than the third threshold.

In an embodiment, the terminal may also execute the conditional handover and the conditional PSCell addition when determining that the execution condition of the conditional handover and the conditional PSCell addition is satisfied.

That is, the terminal may evaluate the execution conditions of the conditional handover and the conditional PSCell addition to determine whether the terminal satisfies the execution conditions of the conditional handover and the conditional PSCell addition, and when the execution conditions of the conditional handover and the conditional PSCell addition are met, the conditional handover and the conditional PSCell addition may be executed. The execution condition of the conditional handover and the execution condition of the conditional PSCell addition are the same.

In an embodiment, the execution conditions of the conditional handover and the conditional PSCell addition are a same execution condition. For example, the execution condition of the conditional handover and of the conditional PSCell addition is that a measurement value is greater than a fourth threshold. Therefore, the terminal may execute the conditional handover and the conditional PSCell addition when determining that the measurement value is greater than the fourth threshold.

It should be noted that the third threshold and the fourth threshold are merely illustrative, and the present disclosure does not limit the size of the third threshold and the fourth threshold.

In the present disclosure, after receiving the information configured for conditional mobility sent by the network device, the terminal may execute the conditional handover and the conditional PSCell change (or the conditional PSCell addition) when the execution condition of the conditional handover and conditional PSCell change (or the conditional PSCell addition) is satisfied. Therefore, according to the satisfaction of the execution condition of the conditional mobility, the corresponding conditional mobility is selectively executed, thereby improving the reliability, accuracy and robustness of mobility management.

Figure 7:
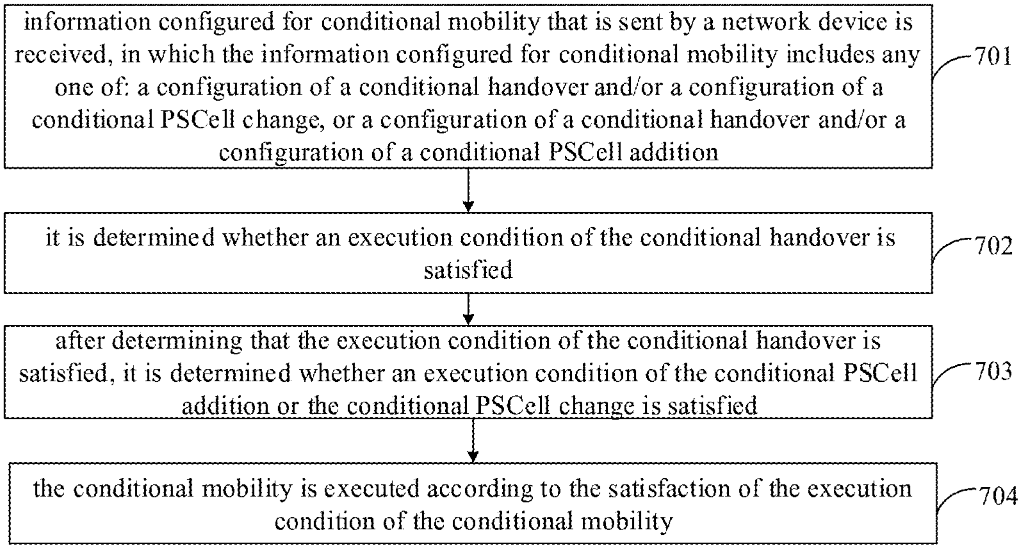
FIG. 7 is a schematic flowchart of a method for management of mobility of a terminal according to an embodiment of the present disclosure.

FIG. 7 is a schematic flowchart of a method for management of mobility of a terminal according to an embodiment of the present disclosure. As shown in FIG. 7, the method may include but is not limited to the following steps.

Step 701: information configured for conditional mobility that is sent by a network device is received, in which the information configured for conditional mobility includes any one of: a configuration of a conditional handover and/or a configuration of a conditional PSCell change, or a configuration of a conditional handover and/or a configuration of a conditional PSCell addition.

In the present disclosure, for a specific implementation process of step 701, reference may be made to the detailed description of any embodiment of the present disclosure, and details are not described herein again.

Step 702: it is determined whether an execution condition of the conditional handover is satisfied.

In the present disclosure, the terminal may evaluate the execution condition of the conditional handover to determine whether the execution condition of the conditional handover is satisfied.

Step 703: after determining that the execution condition of the conditional handover is satisfied, it is determined whether an execution condition of the conditional PSCell addition or the conditional PSCell change is satisfied.

In the present disclosure, after satisfying the execution condition of the conditional handover, the terminal may evaluate the execution condition of the conditional PSCell change or conditional PSCell addition to determine the satisfaction of the execution condition of the conditional PSCell change or conditional PSCell addition.

Step 704: the conditional mobility is executed according to the satisfaction of the execution condition of the conditional mobility.

In the present disclosure, for a specific implementation process of step 704, reference may be made to the detailed description of any embodiment of the present disclosure, and details are not described herein again.

In the present disclosure, after receiving the information configured for conditional mobility sent by the network device, the terminal may determine whether the execution condition of the conditional handover is satisfied, and then, after determining that the execution condition of the conditional handover is satisfied, the terminal may determine whether the execution condition of the conditional PSCell addition or the conditional PSCell change is satisfied, and then execute the conditional mobility based on the satisfaction of the execution condition of the conditional mobility. Therefore, according to the satisfaction of the execution condition of the conditional mobility, the corresponding conditional mobility is selectively executed, thereby improving the reliability, accuracy and robustness of mobility management.

Figure 8:
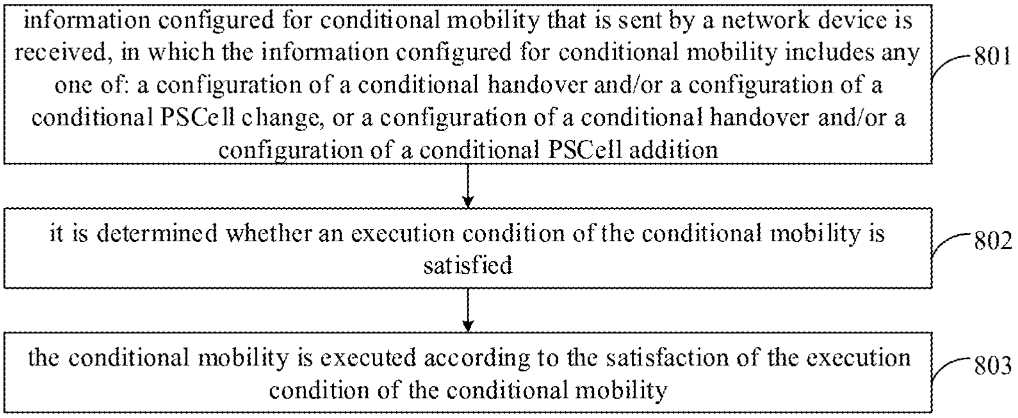
FIG. 8 is a schematic flowchart of a method for management of mobility of a terminal according to an embodiment of the present disclosure.

FIG. 8 is a schematic flowchart of a method for management of mobility of a terminal according to an embodiment of the present disclosure. As shown in FIG. 8, the method may include but is not limited to the following steps.

Step 801: information configured for conditional mobility that is sent by a network device is received, in which the information configured for conditional mobility includes any one of: a configuration of a conditional handover and/or a configuration of a conditional PSCell change, or a configuration of a conditional handover and/or a configuration of a conditional PSCell addition.

In the present disclosure, for a specific implementation process of step 801, reference may be made to the detailed description of any embodiment of the present disclosure, and details are not described herein again.

Step 802: it is determined whether an execution condition of the conditional mobility is satisfied.

In the present disclosure, the terminal may evaluate the execution condition of the conditional mobility to determine whether the terminal satisfies the execution condition of the conditional mobility.

In an embodiment, the terminal may evaluate execution conditions of the conditional handover and the conditional PSCell addition, to determine whether the terminal satisfies the execution conditions of the conditional handover and the conditional PSCell addition.

In an embodiment, the execution condition of the conditional handover and the execution condition of the conditional PSCell change are the same execution condition.

In an embodiment, the terminal may evaluate execution conditions of the conditional handover and the conditional PSCell change, to determine whether the terminal satisfies the execution conditions of the conditional handover and the conditional PSCell change.

In an embodiment, the execution condition of the conditional handover and the execution condition of the conditional PSCell addition are the same execution condition.

In an embodiment, the terminal may evaluate the execution condition of the conditional handover and the execution condition of the conditional PSCell addition, to determine whether the terminal satisfies the execution condition of the conditional handover and the execution condition of the conditional PSCell addition.

In an embodiment, the terminal may evaluate the execution condition of the conditional handover and the execution condition of the conditional PSCell change, to determine whether the terminal satisfies the execution condition of the conditional handover and the execution condition of the conditional PSCell change.

Step 803: the conditional mobility is executed according to the satisfaction of the execution condition of the conditional mobility.

In the present disclosure, after receiving the information for the mobility based on the condition sent by the network device, the terminal may determine whether the execution conditions of the conditional handover and the conditional PSCell addition are satisfied, and then execute the conditional mobility based on the satisfaction of the conditional mobility. Therefore, according to the satisfaction of the execution condition of the conditional mobility, the corresponding conditional mobility is selectively executed, thereby improving the reliability, accuracy and robustness of mobility management.

Figure 9:
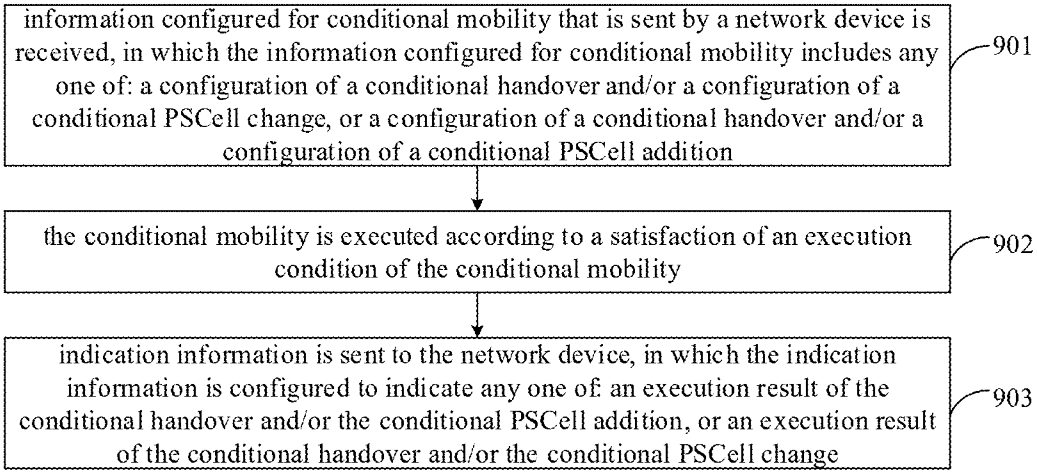
FIG. 9 is a schematic flowchart of a method for management of mobility of a terminal according to an embodiment of the present disclosure.

FIG. 9 is a schematic flowchart of a method for management of mobility of a terminal according to an embodiment of the present disclosure. As shown in FIG. 9, the method may include but is not limited to the following steps.

Step 901: information configured for conditional mobility that is sent by a network device is received, in which the information configured for conditional mobility includes any one of: a configuration of a conditional handover and/or a configuration of a conditional PSCell change, or a configuration of a conditional handover and/or a configuration of a conditional PSCell addition.

Step 902: the conditional mobility is executed according to a satisfaction of an execution condition of the conditional mobility.

In the present disclosure, for a specific implementation process of step 901 to step 902, reference may be made to the detailed description of any embodiment of the present disclosure, and details are not described herein again.

Step 903: indication information is sent to the network device, in which the indication information is configured to indicate any one of: an execution result of the conditional handover and/or the conditional PSCell addition, or an execution result of the conditional handover and/or the conditional PSCell change.

In addition, the execution result may further include a reconfiguration type executed by the terminal, for example, an MCG reconfiguration and/or an SCG reconfiguration. In addition, the MCG reconfiguration may include the conditional handover, etc. and the SCG reconfiguration may include the conditional PSCell addition/conditional PSCell change, and the like.

In the present disclosure, after the terminal executes the conditional handover and the conditional PSCell change (or the conditional PSCell addition), the execution result of the conditional handover and conditional PSCell change (or the conditional PSCell addition) may be included in a radio resource control (RRC) reconfiguration complete message or terminal assistance information, so that after receiving the radio resource control RRC reconfiguration complete message or the terminal assistance information, the network device may determine that the terminal performs the conditional handover and the conditional PSCell change (or the conditional PSCell addition).

The RRC reconfiguration complete message may include reply information corresponding to an MCG mobility execution, to indicate that the UE executes the conditional handover.

Alternatively, the RRC reconfiguration complete message may include reply information corresponding to an SCG mobility execution, to indicate that the UE performs the conditional PSCell addition or the conditional PSCell change.

Alternatively, the RRC reconfiguration complete message may include reply information corresponding to an MCG mobility execution and reply information corresponding to an SCG mobility execution, to indicate that the UE executes the conditional handover and the conditional PSCell addition or the conditional PSCell change. The reply information corresponding to the MCG mobility execution and the reply information corresponding to the SCG mobility execution may be the same or different, and may be the same information or different information, which is not limited in the present disclosure.

The RRC reconfiguration complete message may include reply information corresponding to an SCG mobility execution, in which the message may be forwarded by the master node to the secondary node, and may include the RRC reconfiguration complete message sent to the secondary node.

Alternatively, after performing the conditional handover, the terminal may include the execution result of the conditional handover in the radio resource control RRC reconfiguration complete message or the terminal assistance information, so that after receiving the radio resource control RRC reconfiguration complete message or the terminal assistance information, the network device may determine that the terminal performs the conditional handover.

The RRC reconfiguration complete message may include reply information corresponding to an MCG mobility execution, to indicate that the UE executes the conditional handover.

In an embodiment, the RRC reconfiguration complete message may not include reply information corresponding to an SCG mobility execution, to indicate that the UE does not execute the conditional PSCell addition or the conditional PSCell change.

In the present disclosure, after receiving the information configured for conditional mobility sent by the network device, the terminal may perform the conditional mobility according to a satisfaction of an execution condition of the conditional mobility, and after that, the terminal may send indication information to the network device, to notify the network device terminal that the corresponding conditional mobility is executed. Therefore, according to the satisfaction of the execution condition of the conditional mobility, the corresponding conditional mobility is selectively executed, thereby improving the reliability, accuracy or robustness of mobility management.

Figure 10:
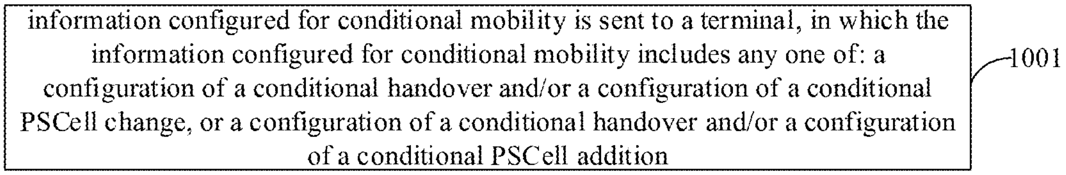
FIG. 10 is a schematic flowchart of a method for management of mobility of a terminal according to an embodiment of the present disclosure.

FIG. 10 is a schematic flowchart of a method for management of mobility of a terminal according to an embodiment of the present disclosure. As shown in FIG. 10, the method may include but is not limited to the following steps.

Step 1001: information configured for conditional mobility is sent to a terminal, in which the information configured for conditional mobility includes any one of: a configuration of a conditional handover and/or a configuration of a conditional PSCell change, or a configuration of a conditional handover and/or a configuration of a conditional PSCell addition.

The information configured for the conditional mobility may include conditional reconfiguration information.

In an embodiment, the information configured for conditional mobility may include at least one of: an execution condition of the conditional mobility, configuration information of a target cell, an association relationship between the conditional handover and the conditional PSCell addition, and an association relationship between the conditional handover and the conditional PSCell change.

In an embodiment, the configuration of the conditional handover may be associated with the configuration of the conditional PSCell change, or the configuration of the conditional handover may be associated with the configuration of the conditional PSCell addition. That is, the network device may jointly configure the conditional handover and the conditional PSCell change, and send a combined configuration of the conditional handover and the conditional PSCell change to the terminal; or the network device may jointly configure the conditional handover and the conditional PSCell addition, and send a combined configuration of the conditional handover and the conditional PSCell addition to the terminal. The combined configuration is that an association of the configuration of the conditional handover and the configuration of the conditional PSCell change, or an association of the configuration of the conditional handover and the configuration of the conditional PSCell addition is implicitly or explicitly indicated by the network device through the sent information.

For example, the configuration of the conditional handover and conditional PSCell change (or the conditional PSCell addition) may be included in a same configuration message, to indicate that the configuration of the conditional handover is associated with the configuration of the conditional PSCell change (or the conditional PSCell addition).

Alternatively, the configuration of the conditional handover and the configuration of the conditional PSCell change may be respectively associated with a same configuration identifier, to indicate that the configuration of the conditional handover is associated with the configuration of the conditional PSCell change; and correspondingly, the configuration of the conditional handover and the configuration of the conditional PSCell addition are respectively associated with a same configuration identifier, to indicate that the configuration of the conditional handover is associated with the configuration of the conditional PSCell addition. The configuration identifier may be any information that can be used for uniquely determining the combined configuration, such as a conditional reconfiguration number, which is not limited in the present disclosure.

Alternatively, an association of the configuration of the conditional handover and the configuration of the conditional PSCell change (or the conditional PSCell addition) may be indicated by indicating a configuration of an associated conditional PSCell change or a configuration of an associated conditional PSCell addition in in the configuration of the conditional handover.

Alternatively, an association of the configuration of the conditional handover and the configuration of the conditional PSCell change, or an association of the configuration of the conditional handover and the configuration of the conditional PSCell addition may be indicated by indicating a configuration of an associated conditional handover in the configuration of the conditional PSCell change or the configuration of the conditional PSCell addition.

Alternatively, an association of the configuration of the conditional handover and the configuration of the conditional PSCell change, or an association of the configuration of the conditional handover and the configuration of the conditional PSCell addition may be indicated by association information.

For example, the association of the configuration of the conditional handover and the configuration of the conditional PSCell change, or the association of the configuration of the conditional handover and the configuration of the conditional PSCell addition may be indicated by information elements (IE); or the association of the configuration of the conditional handover and the configuration of the conditional PSCell change, or the association of the configuration of the conditional handover and the configuration of the conditional PSCell addition may be indicated by an association field.

In the present disclosure, the network device may send the information configured for conditional mobility to the terminal, and then the terminal may perform the conditional mobility according to a satisfaction of an execution condition of the conditional mobility. Therefore, according to the satisfaction of the execution condition of the conditional mobility, the corresponding conditional mobility is selectively executed, thereby improving the reliability, accuracy and robustness of mobility management.

Figure 11:
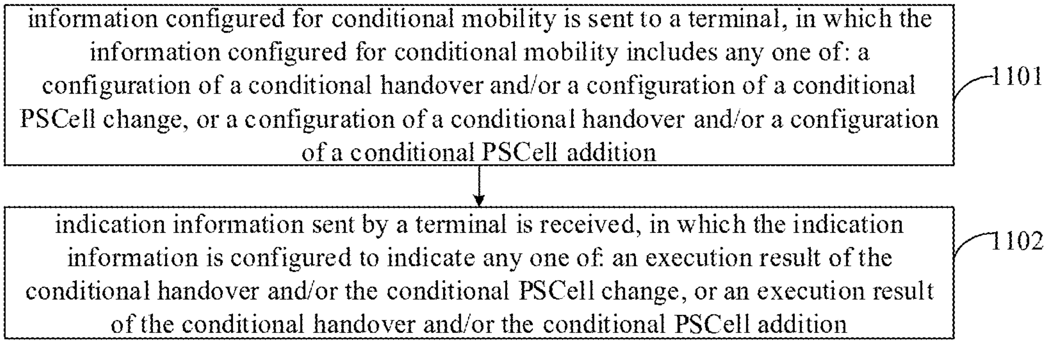
FIG. 11 is a schematic flowchart of a method for management of mobility of a terminal according to an embodiment of the present disclosure.

FIG. 11 is a schematic flowchart of a method for management of mobility of a terminal according to an embodiment of the present disclosure. As shown in FIG. 11, the method may include but is not limited to the following steps.

Step 1101: information configured for conditional mobility is sent to a terminal, in which the information configured for conditional mobility includes any one of: a configuration of a conditional handover and/or a configuration of a conditional PSCell change, or a configuration of a conditional handover and/or a configuration of a conditional PSCell addition.

In the present disclosure, for a specific implementation process of step 1101, reference may be made to the detailed description of any embodiment of the present disclosure, and details are not described herein again.

Step 1102: indication information sent by a terminal is received, in which the indication information is configured to indicate any one of: an execution result of the conditional handover and/or the conditional PSCell change, or an execution result of the conditional handover and/or the conditional PSCell addition.

In addition, the execution result may further include a reconfiguration type executed by the terminal, for example, an MCG reconfiguration and/or an SCG reconfiguration. In addition, the MCG reconfiguration may include the conditional handover, etc. and the SCG reconfiguration may include the conditional PSCell addition/conditional PSCell change, and the like.

In the present disclosure, after the terminal executes the conditional handover and the conditional PSCell change (or the conditional PSCell addition), the execution result of the conditional handover and/or the conditional PSCell change (or the conditional PSCell addition) may be included in a radio resource control RRC reconfiguration complete message or terminal assistance information, so that after receiving the radio resource control RRC reconfiguration complete message or the terminal assistance information, the network device may determine that the terminal executes the conditional handover and the conditional PSCell change (or conditional PSCell addition).

The RRC reconfiguration complete message may include reply information corresponding to an MCG mobility execution, to indicate that the UE executes the conditional handover.

Alternatively, the RRC reconfiguration complete message may include reply information corresponding to an SCG mobility execution, to indicate that the UE executes the conditional PSCell addition or the conditional PSCell change.

Alternatively, the RRC reconfiguration complete message may include reply information corresponding to an MCG mobility execution and reply information corresponding to an SCG mobility execution, to indicate that the UE executes the conditional handover and the conditional PSCell addition or the conditional PSCell change. The reply information corresponding to the MCG mobility execution and the reply information corresponding to the SCG mobility execution may be the same or different, and may be the same information or different information, which is not limited in the present disclosure.

The RRC reconfiguration complete message may include reply information corresponding to an SCG mobility execution, in which the message may be forwarded by the master node to the secondary node, and may include an RRC reconfiguration complete message sent to the secondary node.

Alternatively, after executing the conditional handover, the terminal may include the execution result of the conditional handover in the radio resource control RRC reconfiguration complete message or the terminal assistance information, so that after receiving the radio resource control RRC reconfiguration complete message or the terminal assistance information, the network device may determine that the terminal executes the conditional handover.

The RRC reconfiguration complete message may include reply information corresponding to an MCG mobility execution, to indicate that the UE executes the conditional handover.

In an embodiment, the RRC reconfiguration complete message may not include reply information corresponding to an SCG mobility execution, to indicate that the UE does not perform the conditional PSCell addition or the conditional PSCell change.

In the present disclosure, after the network device sends the information configured for conditional mobility to the terminal, the terminal may execute the conditional mobility according to a satisfaction of an execution condition of a conditional mobility, and send indication information to the network device, to notify the network device that terminal executes a corresponding conditional mobility. Therefore, according to the satisfaction of the execution condition of the conditional mobility, the corresponding conditional mobility is selectively executed, thereby improving the reliability, accuracy and robustness of mobility management.

Figure 12:
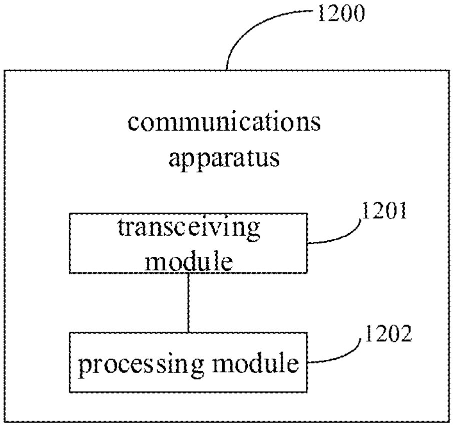
FIG. 12 is a schematic structural diagram of a communication apparatus according to an embodiment of the present disclosure.

FIG. 12 is a schematic structural diagram of a communication apparatus 1200 according to an embodiment of the present disclosure. The communications apparatus 1200 shown in FIG. 12 may include a processing module 1201 and a transceiving module 1202, the transceiving module 1202 may include a sending module and/or a receiving module, the sending module is configured to implement a transmitting function, and the receiving module is configured to implement a receiving function, and the transceiving module 1202 may implement a transmitting function and/or a receiving function.

It may be understood that the communications apparatus 1200 may be a terminal, an apparatus in the terminal, or an apparatus that can be matched and used with the terminal.

For the communication apparatus 1200 on a terminal side:

the transceiving module 1202 is configured to receive information configured for conditional mobility that is sent by a network device, in which the information configured for conditional mobility includes one of: a configuration of a conditional handover and/or a configuration of a conditional PSCell change, or a configuration of the conditional handover and/or a configuration of a conditional PSCell addition; and the processing module 1201 is configured to execute the conditional mobility according to a satisfaction of an execution condition of the conditional mobility.

In an embodiment, the processing module 1201 is further configured to:

start a timer in response to satisfying an execution condition of the conditional handover.

In an embodiment, the processing module 1201 is configured to:

execute the conditional handover and the conditional PSCell change, in response to the timer being running and an execution condition of the conditional PSCell change being satisfied;

execute the conditional handover and the conditional PSCell addition, in response to the timer being running and an execution condition of the conditional PSCell addition being satisfied;

execute the conditional handover and the conditional PSCell change, in response to the timer being running and an execution condition of the conditional handover and the conditional PSCell change being satisfied; or execute the conditional handover and the conditional PSCell addition, in response to the timer being running and an execution condition of the conditional handover and the conditional PSCell addition being satisfied.

In an embodiment, the processing module is further configured to:

stop the timer, in response to the timer being running and satisfying the execution condition of the conditional PSCell change or the execution condition of conditional PSCell addition.

In an embodiment, the processing module 1201 is further configured to:

execute the conditional handover in response to a timeout of the timer;

delete the configuration of the conditional PSCell change or the configuration of the conditional PSCell addition in response to the timeout of the timer; or execute the conditional handover in response to the timeout of the timer and satisfying the execution condition of the conditional handover.

In an embodiment, the processing module 1201 is configured to:

execute the conditional handover and the conditional PSCell change, in response to satisfying an execution condition of the conditional handover and an execution condition of the conditional PSCell change;

execute the conditional handover and the conditional PSCell addition, in response to satisfying the execution condition of the conditional handover and an execution condition of the conditional PSCell addition;

execute the conditional handover and the conditional PSCell change, in response to satisfying an execution condition of the conditional handover and the conditional PSCell change; or execute the conditional handover and the conditional PSCell addition, in response to satisfying an execution condition of the conditional handover and the conditional PSCell addition.

In an embodiment, the configuration of the conditional handover is associated with the configuration of the conditional PSCell change or conditional PSCell addition.

In an embodiment, the processing module 1201 is further configured to:

determine whether an execution condition of the conditional handover is satisfied; and determine whether an execution condition of the conditional PSCell addition or an execution condition of the conditional PSCell change is satisfied, in response to determining that the execution condition of the conditional handover is satisfied.

In an embodiment, the processing module 1201 is further configured to:

determine whether an execution condition of the conditional handover and the conditional PSCell addition is satisfied;

determine whether an execution condition of the conditional handover and the conditional PSCell change is satisfied;

determine whether an execution condition of the conditional handover and an execution condition of the conditional PSCell addition are satisfied; or determine whether an execution condition of the conditional handover and an execution condition of the conditional PSCell change are satisfied.

In an embodiment, the processing module 1201 is further configured to:

restart to determine whether the execution condition of the conditional handover and the conditional PSCell change is satisfied, in response to a timeout of a preset timer; or restart to determine whether the execution condition of the conditional handover and the conditional PSCell addition is satisfied, in response to a timeout of a preset timer.

In an embodiment, the transceiving module 1202 is further configured to:

send indication information to the network device, in which the indication information is configured to indicate any one of: an execution result of the conditional handover and/or the conditional PSCell addition, or an execution result of the conditional handover and/or the conditional PSCell change.

In an embodiment, the indication information is any one of:

a radio resource control (RRC) reconfiguration complete message; or terminal assistance information; or determining whether an execution condition of the conditional handover and an execution condition of the conditional PSCell addition are satisfied; or determining whether an execution condition of the conditional handover and an execution condition of the conditional PSCell change are satisfied.

In an embodiment, the transceiving module 1202 is configured to:

receive a combined configuration of the conditional handover and the conditional PSCell change sent by the network device; or receive a combined configuration of the conditional handover and the conditional PSCell addition sent by the network device.

In an embodiment, the combined configuration implicitly or explicitly indicates that the configuration of the conditional handover is associated with the configuration of the conditional PSCell change, or the configuration of the conditional handover is associated with the configuration of the conditional PSCell addition.

In an embodiment, the combined configuration of the conditional handover and the conditional PSCell change or the combined configuration of the conditional handover and the conditional PSCell addition includes any one of:

the configuration of the conditional handover and conditional PSCell change being included in a same configuration, or the configuration of the conditional handover and conditional PSCell addition being included in a same configuration;

the configuration of the conditional handover and the configuration of the conditional PSCell change being associated with a same configuration identifier, or the configuration of the conditional handover and the configuration of the conditional PSCell addition being associated with a same configuration identifier;

a configuration of an associated conditional PSCell change or a configuration of an associated conditional PSCell addition being indicated in the configuration of the conditional handover;

a configuration of an associated conditional handover being indicated in the configuration of the conditional PSCell change or the configuration of the conditional PSCell addition; or an association of the configuration of the conditional handover and the configuration of the conditional PSCell change or an association of the configuration of the conditional handover and the configuration of the conditional PSCell addition being indicated through association information.

In an embodiment, the information configured for conditional mobility includes conditional reconfiguration information.

In the present disclosure, after receiving the information configured for conditional mobility sent by the network device, the terminal may execute the conditional mobility according to a satisfaction of an execution condition of the conditional mobility. Therefore, according to the satisfaction of the execution condition of the conditional mobility, the corresponding conditional mobility is selectively executed, thereby improving the reliability, accuracy and robustness of mobility management.

It may be understood that the communications apparatus 1200 may be a network device, an apparatus in the network device, or an apparatus that can be matched and used with a network device.

For the communications apparatus 1200 being on a network device side:

The transceiving module 1202 is configured to send information configured for conditional mobility to the terminal, in which the information configured for the conditional mobility includes any one of: a configuration of a conditional handover and/or a configuration of a conditional PSCell change, or a configuration of a conditional handover and/or a configuration of a conditional PSCell addition.

In an embodiment, the transceiving module 1202 is further configured to:

receive indication information sent by the terminal, in which the indication information is configured to indicate any one of: an execution result of the conditional handover and/or the conditional PSCell change, or an execution result of the conditional handover and/or the conditional PSCell addition.

In an embodiment, the indication information is any one of:

a radio resource control (RRC) reconfiguration complete message;

terminal assistance information;

information sent through the RRC reconfiguration complete message; or information sent through the terminal assistance information.

In an embodiment, the transceiving module 1202 is configured to:

send a combined configuration of the conditional handover and the conditional PSCell change to the terminal; or send a combined configuration of the conditional handover and the conditional PSCell addition to the terminal.

In an embodiment, the combined configuration implicitly or explicitly indicates that the configuration of the conditional handover is associated with the configuration of the conditional PSCell change, or the configuration of the conditional handover is associated with the configuration of the conditional PSCell addition.

In an embodiment, the combined configuration of the conditional handover and the conditional PSCell change or the combined configuration of the conditional handover and the conditional PSCell addition includes any one of:

the configuration of the conditional handover and conditional PSCell change being included in a same configuration, or the configuration of the conditional handover and conditional PSCell addition being included in a same configuration;

the configuration of the conditional handover and the configuration of the conditional PSCell change being associated with a same configuration identifier, or the configuration of the conditional handover and the configuration of the conditional PSCell addition being associated with a same configuration identifier;

a configuration of an associated conditional PSCell change or a configuration of an associated conditional PSCell addition being indicated in the configuration of the conditional handover;

a configuration of an associated conditional handover being indicated in the configuration of the conditional PSCell change or the configuration of the conditional PSCell addition; or an association of the configuration of the conditional handover and the configuration of the conditional PSCell change or an association of the configuration of the conditional handover and the configuration of the conditional PSCell addition being indicated through association information.

In the present disclosure, the network device may send the information configured for conditional mobility to the terminal, and then the terminal may execute the conditional mobility according to a satisfaction of an execution condition of the conditional mobility. Therefore, according to the satisfaction of the execution condition of the conditional mobility, the corresponding conditional mobility is selectively executed, thereby improving the reliability, accuracy and robustness of mobility management.

of another communication apparatus 1300 according to an embodiment of the present disclosure. The communications apparatus 1300 may be a network device, a terminal, or may be a chip, a chip system, a processor, or the like that supports the network device to implement the foregoing methods, or may be a chip, a chip system, a processor, or the like that supports the terminal to implement the foregoing methods. The apparatus may be configured to implement the methods described in the foregoing method embodiments, for details, refer to the descriptions in the foregoing method embodiments.

The communications apparatus 1300 may include one or more processors 1301, and the processor 1301 may be a general-purpose processor or a dedicated processor. The baseband processor or the central processing unit may be, for example, a baseband processor or a central processing unit. The baseband processor may be configured to process a communication protocol and communication data, and the central processing unit may be configured to control the communication apparatus (for example, a base station, a baseband chip, a terminal, a terminal chip, a DU, or a CU), execute a computer program, and process data of the computer program.

In an embodiment, the communications apparatus 1300 may further include one or more memories 1302, in which the communications apparatus 1300 may store a computer program 1304, and the processor 1301 executes the computer program 1304, so that the communications apparatus 1300 performs the methods described in the foregoing method embodiments. In an embodiment, the memory 1302 may further store data. The communication apparatus 1300 and the memory 1302 may be separately disposed, or may be integrated together.

In an embodiment, the communications apparatus 1300 may further include a transceiver 1305, and the antenna 1306. The transceiver 1305 may be referred to as a transceiving unit, a transceiving machine, a transceiving circuit, or the like, and is configured to implement a transceiver function. The transceiver 1305 may include a receiver and a transmitter, the receiver may be referred to as a receiver or a receiving circuit, and is configured to implement a receiving function; and the transmitter may be referred to as a transmitter or a transmitting circuit, and is configured to implement a transmitting function.

In an embodiment, the communications apparatus 1300 may further include one or more interface circuits 1307, and the interface circuit 1307 is configured to receive a code instruction and transmit the code instruction to the processor 1301, and the processor 1301 runs the code instruction, so that the communications apparatus 1300 performs the methods described in the foregoing method embodiments.

When the communications apparatus 1300 is a terminal: the processor 1301 is configured to perform step 202 in FIG. 2; step 302 and step 303 in FIG. 3; step 402 and step 403 in FIG. 4; step 502 and step 503 in FIG. 5; step 602 in FIG. 6; step 702, step 703, and step 704 in FIG. 7; step 802 and step 803 in FIG. 8; step 902 and step 903 in FIG. 9; and the like.

When the communication apparatus 1300 is a network device: the transceiver 1305 is configured to perform step 1001 in FIG. 10; and step 1101 and step 1102 in FIG. 11, and the like.

In an implementation, the processor 1301 may include a transceiver configured to implement a receiving function and a transmitting function. For example, the transceiver may be a transceiver circuit, an interface, or an interface circuit. The transceiver circuit, the interface, or the interface circuit configured to implement the receiving and transmitting functions may be separate, or may be integrated together. The transceiver circuit, the interface, or the interface circuit may be configured to read/write code/data, or the transceiver circuit, the interface, or the interface circuit may be configured to transmit or transfer a signal.

In an implementation, the processor 1301 may store a computer program 1303, and the computer program 1303 runs on the processor 1301, so that the communication apparatus 1300 may perform the methods described in the foregoing method embodiments. The computer program 1303 may be cured in the processor 1301, and in this case, the processor 1301 may be implemented by hardware.

In an implementation, the communications apparatus 1300 may include a circuit, and the circuit may implement a function of transmitting or receiving or communicating in the foregoing method embodiments. The processor and the transceiver described in the present disclosure may be implemented on an integrated circuit (IC), an analog IC, a radio frequency integrated circuit (RFIC), a mixed signal IC, an application specific integrated circuit (ASIC), a printed circuit board (PCB), an electronic device, and the like. The processor and the transceiver may also be fabricated using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), etc.

Figure 13:
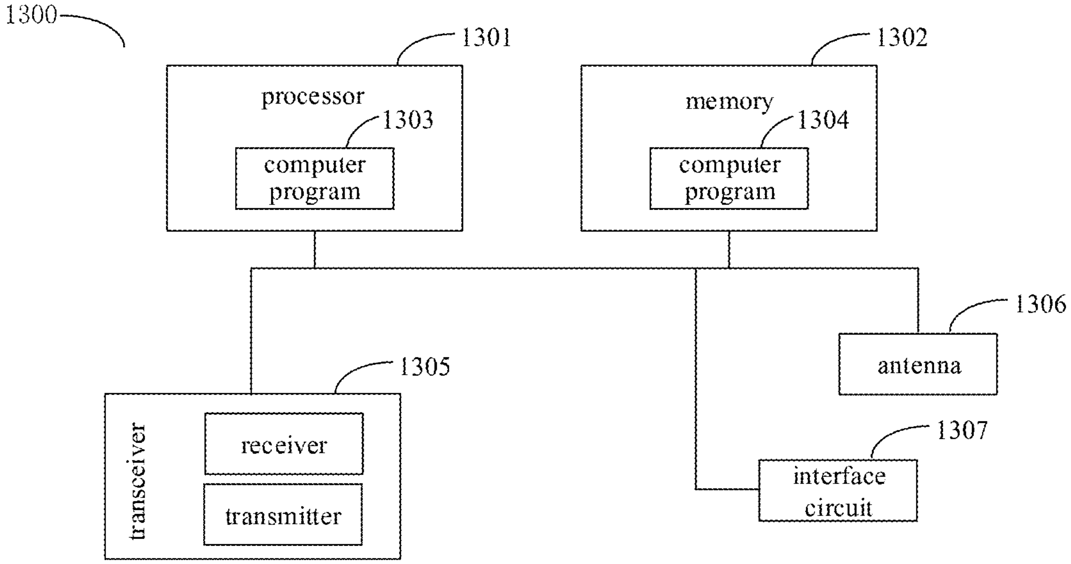
FIG. 13 is a schematic structural diagram of another communication apparatus according to an embodiment of the present disclosure.

The communication apparatus described in the foregoing embodiments may be a network device or a terminal, but the scope of the communication apparatus described in the present disclosure is not limited thereto, and the structure of the communication apparatus may not be limited by FIG. 13. The communication device may be a standalone device or may be part of a larger device. For example, the communication apparatus may be:

(1) an independent integrated circuit IC, or a chip, or a chip system or subsystem;

(2) a set having one or more ICs, alternatively, the IC set may also include a storage component for storing data and a computer program;

(3) an ASIC, such as a modem;

(4) a module that can be embedded in other devices;

(5) a receiver, a terminal, a smart terminal, a cellular phone, a wireless device, a handset, a mobile unit, a vehicle-mounted device, a network device, a cloud device, an artificial intelligence device, etc.; and (6) others.

Figure 14:
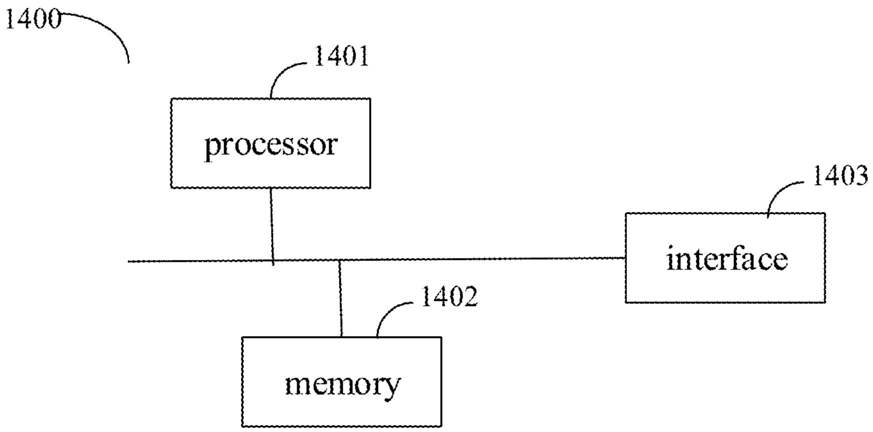
FIG. 14 is a schematic structural diagram of a chip according to an embodiment of the present disclosure.

For a case that the communication apparatus may be a chip or a chip system, refer to a schematic structural diagram of the chip shown in FIG. 14. The chip shown in FIG. 14 includes a processor 1401 and an interface 1403. There may be one or more processors 1401, and there may be a plurality of interfaces 1403.

The chip is configured to implement a function of the terminal in the embodiments of the present disclosure:

The interface 1403 is configured to perform step 201 in FIG. 2; step 301 in FIG. 3; step 401 in FIG. 4; step 501 in FIG. 5; step 601 in FIG. 6; step 701 in FIG. 7; step 801 in FIG. 8; step 901 in FIG. 9; and the like.

The chip is configured to implement a function of the network device in the embodiments of the present disclosure:

The interface 1403 is configured to perform step 1001 in FIG. 10; step 1101 and step 1102 in FIG. 11; and the like.

In an embodiment, the chip further includes a memory 1402, and the memory 1402 is configured to store necessary computer programs and data.

Those skilled in the art may further understand that various illustrative logical blocks and steps listed in the embodiments of the present disclosure may be implemented by electronic hardware, computer software, or a combination of the two. Whether such functionality is implemented by hardware or software depends upon the particular application and design requirements of the overall system. A person skilled in the art may use various methods to implement the functions for each particular application, which should not be understood as beyond the protection scope of embodiments of the present disclosure.

The present disclosure further provides a readable storage medium having stored thereon instructions which, when executed by a computer, implement the functions of any one of the above method embodiments.

The present disclosure further provides a computer program product that, when executed by a computer, implements the functions of any one of the above method embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs. When the computer program is loaded and executed on a computer, the procedure or functions according to the embodiments of the present disclosure are all or partially generated. The computer may be a general-purpose computer, a dedicated computer, a computer network, or another programmable apparatus. The computer program may be stored in a computer-readable storage medium or transmitted from one computer-readable storage medium to another computer-readable storage medium, for example, the computer program may be transmitted from a website, a computer, a server, or a data center to another website, a computer, a server, or a data center in a wired (for example, a coaxial cable, an optical fiber, a digital subscriber line (DSL)), or a wireless (for example, infrared, wireless, microwave, or the like). The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disk (DVD)), a semiconductor medium (for example, a solid state disk (SSD)), or the like.

A person of ordinary skill in the art may understand that various numerical numbers, such as first and second, involved in the present disclosure are merely distinguished for ease of description, and are not intended to limit the scope of the embodiments of the present disclosure, and also represent a sequence.

At least one of the present disclosure may also be described as one or more, and the plurality may be two, three, four, or more, which is not limited in the present disclosure. In the embodiments of the present disclosure, for a technical feature, technical features in the technical features are distinguished by "first", "second", "third", "A", "B", "C" and "D", etc. and the technical features described by "first", "second", "third", "A", "B", "C" and "D" do not have a sequential order or a sequence of sizes.

The correspondence shown in the tables in the present disclosure may be configured or predefined. The value of the information in each table is merely an example, and may be configured as other values, which is not limited in the present disclosure. When the correspondence between the configuration information and the parameters does not need to be configured, all the corresponding relationships shown in the tables must be configured. For example, in the table in the present disclosure, the correspondence shown in some rows may also not be configured. For another example, appropriate deformation adjustment may be performed based on the foregoing table, for example, splitting, merging, and the like. The names of the parameters in the foregoing tables may also be other names that may be understood by using a communication apparatus, and a value or a representation manner of the parameters may also be understood by a communication apparatus in another value or representation manner. When the foregoing tables are implemented, other data structures may also be used, for example, an array, a queue, a container, a stack, a linear table, a pointer, a linked list, a tree, a graph, a structure, a class, a heap, a hash table, or the like may be used.

The term "predefined" in the present disclosure may be understood as definition, pre-definition, storage, pre-storage, pre-negotiation, pre-configuration, curing, or pre-firing.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, which should not be considered as beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

The above are only specific implementations of the present disclosure, but the protection scope of the present disclosure is not limited thereto, and any changes or substitutions can be easily conceived of by those skilled in the art within the technical scope disclosed in the present disclosure, which should be covered within the protection scope of the present disclosure. Therefore, the protection scope of the present disclosure shall be subject to the protection scope of the claims.

What is claimed is:

1. A method for management of mobility of a terminal, performed by a terminal, comprising:

receiving information configured for conditional mobility that is sent by a network device, wherein the information configured for conditional mobility comprises one of:

a configuration of a conditional handover and a configuration of a conditional primary secondary cell (PSCell) change, or a configuration of the conditional handover and a configuration of a conditional PSCell addition; and executing the conditional mobility according to a satisfaction of an execution condition of the conditional mobility.

2. The method according to claim 1, wherein executing the conditional mobility according to the satisfaction of the execution condition of the conditional mobility comprises:

executing the conditional handover and the conditional PSCell change, in response to satisfying an execution condition of the conditional handover and an execution condition of the conditional PSCell change;

executing the conditional handover and the conditional PSCell addition, in response to satisfying the execution condition of the conditional handover and an execution condition of the conditional PSCell addition;

executing the conditional handover and the conditional PSCell change, in response to satisfying an execution condition of the conditional handover and the conditional PSCell change; or executing the conditional handover and the conditional PSCell addition, in response to satisfying an execution condition of the conditional handover and the conditional PSCell addition.

3. The method according to claim 2, wherein executing the conditional handover and the conditional PSCell change, in response to satisfying an execution condition of the conditional handover and an execution condition of the conditional PSCell change comprises:

determining whether the execution condition of the conditional handover and the execution condition of the conditional PSCell change are satisfied, by evaluating the execution condition of the conditional handover and the execution condition of the conditional PSCell change respectively; and executing the conditional handover and the conditional PSCell change, in response to satisfying the execution condition of the conditional handover and the execution condition of the conditional PSCell change; or wherein executing the conditional handover and the conditional PSCell addition, in response to satisfying the execution condition of the conditional handover and an execution condition of the conditional PSCell addition comprises:

determining whether the execution condition of the conditional handover and the execution condition of the conditional PSCell addition are satisfied, by evaluating the execution condition of the conditional handover and the execution condition of the conditional PSCell addition respectively; and executing the conditional handover and the conditional PSCell addition, in response to satisfying the execution condition of the conditional handover and the execution condition of the conditional PSCell addition.

4. The method according to claim 1, wherein after receiving the information configured for the conditional mobility that is sent by the network device, the method further comprises:

determining whether an execution condition of the conditional handover and the conditional PSCell addition is satisfied;

determining whether an execution condition of the conditional handover and the conditional PSCell change is satisfied;

determining whether an execution condition of the conditional handover and an execution condition of the conditional PSCell addition are satisfied; or determining whether an execution condition of the conditional handover and an execution condition of the conditional PSCell change are satisfied.

5. The method according to claim 1, further comprising:

sending indication information to the network device, wherein the indication information is configured to indicate: an execution result of the conditional handover and the conditional PSCell addition, or an execution result of the conditional handover and the conditional PSCell change.

6. The method according to claim 5, wherein the indication information comprises at least one of:

a radio resource control (RRC) reconfiguration complete message;

terminal assistance information;

information sent through the RRC reconfiguration complete message; or information sent through the terminal assistance information.

7. The method according to claim 1, wherein the configuration of the conditional handover is associated with the configuration of the conditional PSCell change or conditional PSCell addition, and receiving the information configured for the conditional mobility that is sent by the network device comprises:

receiving a combined configuration of the conditional handover and the conditional PSCell change sent by the network device; or receiving a combined configuration of the conditional handover and the conditional PSCell addition sent by the network device.

8. The method according to claim 7, wherein the combined configuration implicitly or explicitly indicates that the configuration of the conditional handover is associated with the configuration of the conditional PSCell change, or the configuration of the conditional handover is associated with the configuration of the conditional PSCell addition.

9. The method according to claim 7, wherein the combined configuration of the conditional handover and the conditional PSCell change or the combined configuration of the conditional handover and the conditional PSCell addition comprises one of:

the configuration of the conditional handover and conditional PSCell change being comprised in a same configuration, or the configuration of the conditional handover and conditional PSCell addition being comprised in a same configuration;

the configuration of the conditional handover and the configuration of the conditional PSCell change being associated with a same configuration identifier, or the configuration of the conditional handover and the configuration of the conditional PSCell addition being associated with a same configuration identifier;

a configuration of an associated conditional PSCell change or a configuration of an associated conditional PSCell addition being indicated in the configuration of the conditional handover;

a configuration of an associated conditional handover being indicated in the configuration of the conditional PSCell change or the configuration of the conditional PSCell addition; or an association of the configuration of the conditional handover and the configuration of the conditional PSCell change or an association of the configuration of the conditional handover and the configuration of the conditional PSCell addition being indicated through association information.

10. The method according to claim 1, wherein the information configured for conditional mobility comprises conditional reconfiguration information.

11. A non-transitory computer-readable storage medium for storing instructions that, when being executed by a processor, cause the processor to perform the method according to claim 1.

12. A method for management of mobility of a terminal, performed by a network device, comprising:

sending information configured for conditional mobility to a terminal, wherein the information configured for the conditional mobility comprises one of:

a configuration of a conditional handover and a configuration of a conditional primary secondary cell (PSCell) change, or a configuration of the conditional handover and/er and a configuration of a conditional PSCell addition.

13. The method according to claim 12, further comprising:

receiving indication information sent by the terminal, wherein the indication information is configured to indicate: an execution result of the conditional handover and the conditional PSCell change, or an execution result of the conditional handover and the conditional PSCell addition.

14. The method according to claim 13, wherein the indication information comprises at least one of:

a radio resource control (RRC) reconfiguration complete message;

terminal assistance information;

information sent through the RRC reconfiguration complete message; or information sent through the terminal assistance information.

15. The method according to claim 12, wherein the configuration of the conditional handover is associated with the configuration of the conditional PSCell change or conditional PSCell addition, and sending the information configured for the conditional mobility to the terminal comprises:

sending a combined configuration of the conditional handover and the conditional PSCell change to the terminal; or sending a combined configuration of the conditional handover and the conditional PSCell addition to the terminal.

16. The method according to claim 15, wherein the combined configuration implicitly or explicitly indicates that the configuration of the conditional handover is associated with the configuration of the conditional PSCell change, or the configuration of the conditional handover is associated with the configuration of the conditional PSCell addition.

17. The method according to claim 15, wherein the combined configuration of the conditional handover and the conditional PSCell change or the combined configuration of the conditional handover and the conditional PSCell addition comprises one of:

the configuration of the conditional handover and conditional PSCell change being comprised in a same configuration, or the configuration of the conditional handover and conditional PSCell addition being comprised in a same configuration;

the configuration of the conditional handover and the configuration of the conditional PSCell change being associated with a same configuration identifier, or the configuration of the conditional handover and the configuration of the conditional PSCell addition being associated with a same configuration identifier;

a configuration of an associated conditional PSCell change or a configuration of an associated conditional PSCell addition being indicated in the configuration of the conditional handover;

a configuration of an associated conditional handover being indicated in the configuration of the conditional PSCell change or the configuration of the conditional PSCell addition; or an association of the configuration of the conditional handover and the configuration of the conditional PSCell change or an association of the configuration of the conditional handover and the configuration of the conditional PSCell addition being indicated through association information.

18. A network device, comprising:

a processor; and a memory storing a computer program executable by the processor, wherein the processor is configured to perform the method according to claim 12.

19. A non-transitory computer-readable storage medium for storing instructions that, when being executed by a processor, cause the processor to perform the method according to claim 12.

20. A terminal, comprising:

a processor; and a memory storing a computer program executable by the processor, wherein the processor is configured to:

receive information configured for conditional mobility that is sent by a network device, wherein the information configured for conditional mobility comprises one of:

a configuration of a conditional handover and a configuration of a conditional primary secondary cell (PSCell) change, or a configuration of the conditional mobility and a configuration of a conditional PSCell addition; and execute the conditional mobility according to a satisfaction of an execution condition of the conditional mobility.

* * * * *